(12) United States Patent
Graves et al.

(10) Patent No.: US 10,920,983 B2
(45) Date of Patent: Feb. 16, 2021

(54) COUNTER-SWIRL DOUBLET COMBUSTOR WITH PLUNGED HOLES

(71) Applicant: Rolls-Royce Corporation, Indianapolis, IN (US)

(72) Inventors: Charles B. Graves, Avon, IN (US); Mindi D. Moore, Plainfield, IN (US); Afework Woubshet, Indianapolis, IN (US); Randall E. Yount, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 392 days.

(21) Appl. No.: 14/964,799

(22) Filed: Dec. 10, 2015

(65) Prior Publication Data

US 2016/0169517 A1 Jun. 16, 2016

Related U.S. Application Data

(60) Provisional application No. 62/089,987, filed on Dec. 10, 2014.

(51) Int. Cl.
*F23R 3/00* (2006.01)
*F23R 3/06* (2006.01)
(Continued)

(52) U.S. Cl.
CPC .................. *F23R 3/06* (2013.01); *F02C 3/04* (2013.01); *F23R 3/002* (2013.01); *F23R 3/60* (2013.01);
(Continued)

(58) Field of Classification Search
CPC .. F23R 3/06; F23R 3/002; F23R 3/045; F23R 3/04; F23R 3/10
See application file for complete search history.

(56) References Cited

U.S. PATENT DOCUMENTS 5,138,841 A 8/1992 Skidmore
8,141,365 B2 3/2012 Bronson et al.
(Continued)

FOREIGN PATENT DOCUMENTS

EP 2211106 A2 7/2010
EP 2224168 A2 9/2010
(Continued)

OTHER PUBLICATIONS

European Search Report for App. No. EP15197420 dated Apr. 7, 2016.

*Primary Examiner* — Todd E Manahan
*Assistant Examiner* — Edwin Kang
(74) *Attorney, Agent, or Firm* — Fishman Stewart PLLC

(57) ABSTRACT

An improved system, apparatus and method may comprise an inner liner and an outer liner extending circumferentially around an engine centerline axis thereby forming a combustion chamber therebetween. The system, apparatus, and method may include a front end extending between the inner and outer liners and having a plurality of fuel nozzle ports configured to each receive a fuel nozzle. First and second outer plunged inlet holes may be formed in the outer liner and extending in a first radial direction toward the engine centerline axis and into at least a portion of the combustion chamber. First and second inner plunged inlet holes may be formed in the inner liner and extending in a second radial direction away from the engine centerline axis and into at least a portion of the combustion chamber.

19 Claims, 3 Drawing Sheets

(51) Int. Cl.
*F02C 3/04* (2006.01)
*F23R 3/60* (2006.01)

(52) U.S. Cl.
CPC ...... *F05D 2220/32* (2013.01); *F05D 2240/24* (2013.01); *F05D 2250/14* (2013.01); *F05D 2250/70* (2013.01); *Y02T 50/60* (2013.01)

(56) References Cited

U.S. PATENT DOCUMENTS

| | | |
|---|---|---|
| 8,171,740 B2 | 5/2012 | Bronson et al. |
| 8,387,397 B2 | 3/2013 | Chen et al. |
| 8,616,004 B2 | 12/2013 | Zupanc et al. |
| 2003/0177769 A1* | 9/2003 | Graves .................. F23R 3/04 60/752 |
| 2007/0193248 A1 | 8/2007 | Bessagnet et al. |
| 2008/0127651 A1* | 6/2008 | Zupanc .................. F23R 3/06 60/752 |
| 2010/0186416 A1* | 7/2010 | Chen .................. F23R 3/06 60/755 |
| 2013/0255265 A1* | 10/2013 | Rudrapatna .............. F23R 3/06 60/754 |
| 2014/0102106 A1 | 4/2014 | Snyder et al. |
| 2014/0144145 A1* | 5/2014 | Rackwitz .............. F23R 3/045 60/751 |
| 2015/0040576 A1* | 2/2015 | Graves .................. F23R 3/06 60/776 |

FOREIGN PATENT DOCUMENTS

| | | | |
|---|---|---|---|
| EP | 2224170 A2 | 9/2010 | |
| EP | 2413036 A2 | 2/2012 | |
| WO | WO 2012113553 A1 * | 8/2012 | .............. F23R 3/045 |

\* cited by examiner

US 10,920,983 B2

COUNTER-SWIRL DOUBLET COMBUSTOR WITH PLUNGED HOLES

CROSS-REFERENCE TO RELATED APPLICATIONS

This application claims priority to U.S. Provisional Patent Application No. 62/089,987 filed Dec. 10, 2014, the contents of which is hereby incorporated in its entirety.

FIELD OF TECHNOLOGY

An improved system for a gas turbine engine, and more specifically, a combustor having a counter swirl doublet for improved fuel and air mixing.

BACKGROUND

Gas turbines typically include a compressor, a combustor, and a turbine. The compressor compresses air drawn into the engine and delivers high pressure air to the combustor. In the combustor, fuel is mixed with the high pressure air and is ignited. Products of a combustion reaction in the combustor are directed into the turbine where work is extracted to drive the compressor and, sometimes, an output shaft. More specifically, combustors in gas turbine engines provide an energy release that drives the turbine. This energy release takes the form of high temperature gasses. The handling of these gases drive the overall performance of the engine.

There is a need for a combustor system, apparatus, and method configured having a combustor liner configured to produce a radial profile optimized for the turbine while minimizing a pattern factor experienced by the combustor. It may also be helpful to reduce unwanted exhaust products and pollutants to increase a durability of the combustor.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

Figure 1:
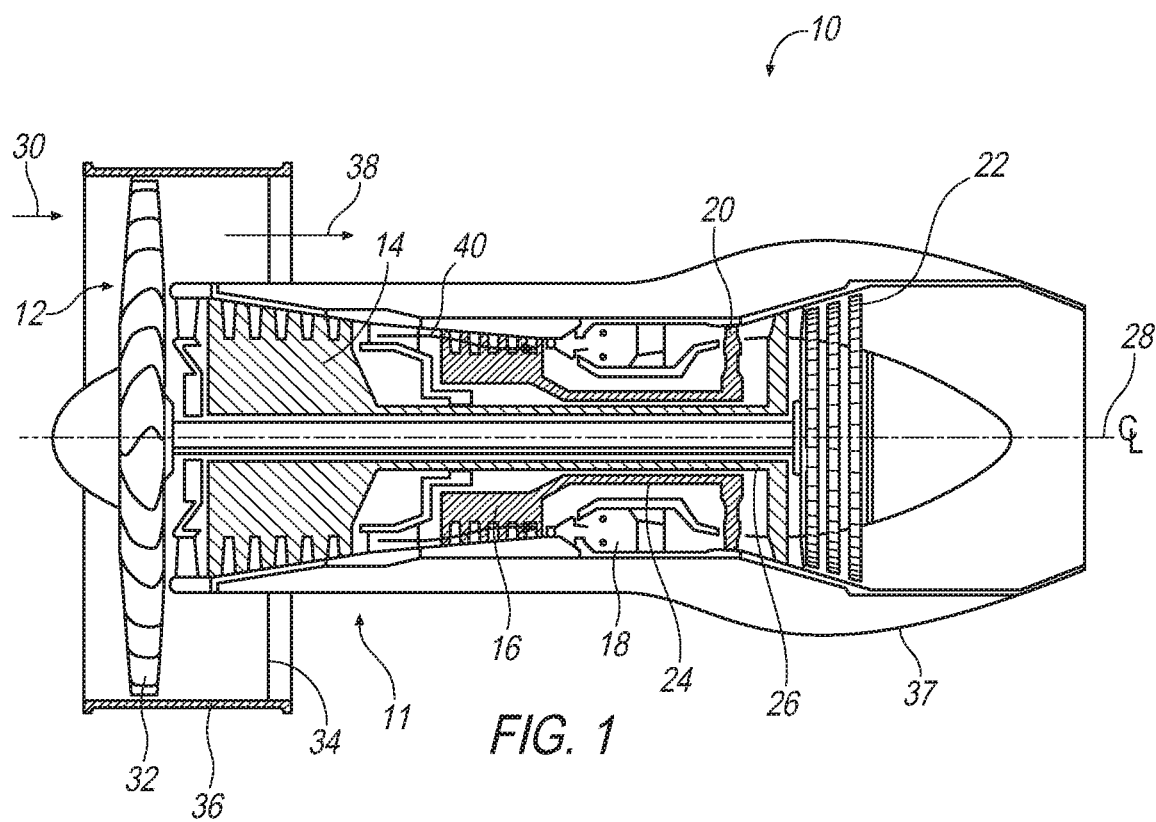
FIG. 1 illustrates an exemplary gas turbine engine.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates.

DETAILED DESCRIPTION

An exemplary system may include an inner liner and an outer liner extending circumferentially around an engine centerline axis thereby forming a combustion chamber therebetween. The system may include a dome extending between the inner and outer liners and having a plurality of fuel nozzle ports configured to each receive a fuel nozzle. Each fuel nozzle port may have a port centerline axis extending axially therethrough. The system may include first and second outer plunged inlet holes formed in the outer liner substantially to a first side of the port centerline axis of each fuel nozzle port and extending in a first radial direction toward the engine centerline axis and into at least a portion of the combustion chamber. The system may further include first and second inner plunged inlet holes formed in the inner liner substantially to a second side of the port centerline axis of each fuel nozzle port and extending in a second radial direction away from the engine centerline axis and into at least a portion of the combustion chamber.

FIG. 1 illustrates a gas turbine engine 10, which includes a fan 12, a low pressure compressor 14, a high pressure compressor 16, a combustor 18, a high pressure turbine 20, and a low pressure turbine 22. The high pressure compressor 16 is connected to a first rotor shaft 24 while the low pressure compressor 14 is connected to a second rotor shaft 26. The shafts 24, 26 extend axially and are parallel to an engine centerline axis 28. Ambient air 30 enters the fan 12 and is directed across a fan rotor 32 in an annular fan bypass duct 34, which in part is circumscribed by nacelle 36. The bypass airflow 38 provides engine thrust while the primary gas stream 40 is directed to the combustor 18 and the high pressure turbine 20. The fan nacelle 36 is spaced radially outwardly from the core casing 37 to define an annular bypass duct 34 therebetween. During operation, the core engine 11 powers the fan 12 which pressurizes ambient air 30 to produce propulsion thrust in the fan air 38 bypassing the core engine 11 and discharged from the fan exhaust nozzle (not shown).

Combustion temperature uniformity across the outlet of a combustion chamber is important to the efficiency and operational life of the combustor 18 and to other components in a gas turbine engine 10. If sufficient mixing is not achieved, a non-uniform temperature variation of combustion products exiting the combustor 18 may result. This could potentially subject downstream turbine components to localized overheating. Such overheating can affect the durability of downstream turbine parts and could potentially decrease overall turbine efficiency and longevity. As such, the more thorough the mixing and combusting of fuel and air, the lower the likelihood of localized overheating due to hot spots or hot streaks in the combustion byproducts. Hot streaks or hot spots are defined an area of increased temperature relative to the bulk gas temperature of the hot combustion gas byproducts. The apparatus, system, and methods herein may provide, for example, an optimized radial profile and pattern factor for improved temperature uniformity.

Figure 2:
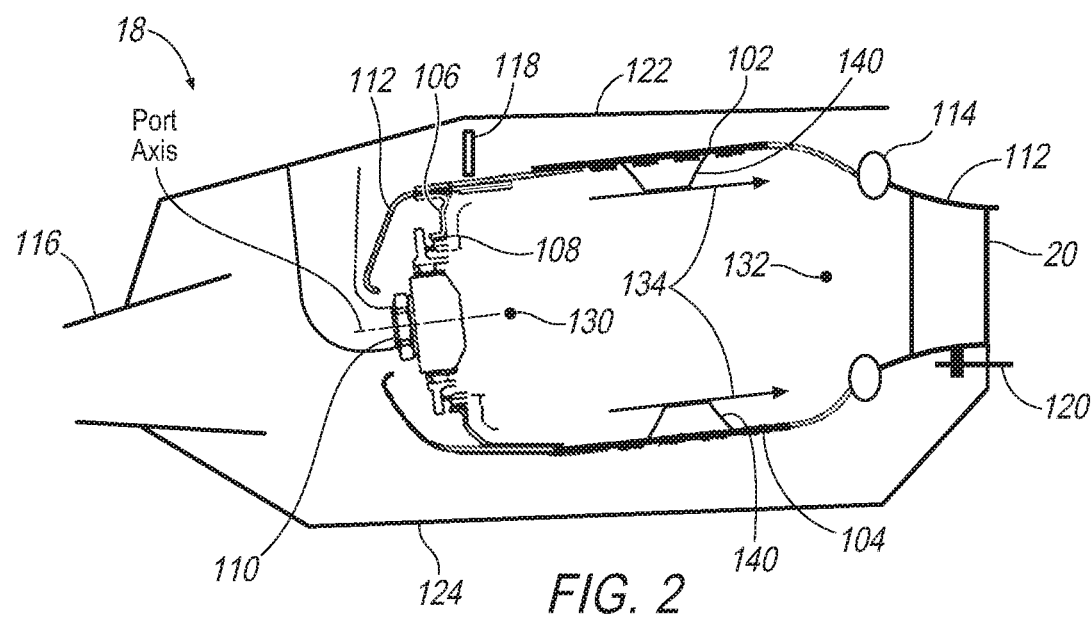
FIG. 2 illustrates an exemplary combustor of the present disclosure.

FIG. 2 illustrates an exemplary combustor 18. The combustor 18 may include an outer liner 102 and an inner liner 104 defining a combustion chamber therebetween. The combustor 18 may further include a forward end 130 having a dome 106 and a rearward end 132, downstream of the forward end 130. The combustor 18 may include one or a plurality of fuel nozzles 110 operably connected to the dome 106. The fuel nozzles 110 can optionally include an air swirler to mix air at the point of fuel injection, near the forward end 130. The fuel nozzles 110 may include a fuel swirler to impart a swirl into the injected fuel about a port centerline axis. The combustor 18 may include one or more rows of air inlets (e.g., also referred to as "primary holes" or "combustion holes") formed as doublet pairs for a corresponding fuel nozzle in both the inner liner 104 and the outer liner 102 of the combustor 18.

The outer liner 102 and inner liner 104 may be positioned within an outer case 122 and an inner case 124 and to at least one of the outer case 122 and the inner case 124. At least one of the outer liner 102 and inner liner 104 may be secured relative to a diffuser 116 configured to direct an airflow 134 (e.g., cooling air) along each of the outer liner 102 and inner liner 104 and into the combustion chamber. The outer liner 102 may be secured relative to the outer case 122, for example, using mount pin 118. The outer liner 102 and inner liner 104 may each be connected to vane platform 112, for example, using seals 114. The vane platform 112 may be secured relative to the inner case 124, for example, using vane mount 120.

The plunged inlet holes 140 may include numerous advantages over traditional chutes and holes. For example, plunged inlet holes 140 may be configured to provide less entrance loss thereby optimizing the jet air into the combustion chamber. More specifically, the plunged inlet holes 140 may include a shortened penetration depth configured to jet air beyond airflow 134 (e.g., cooling air) and into the hot core of the combustion chamber thereby minimizing the mixing of jet air with airflow 134. The plunged inlet holes 140 may provide sufficient penetration of jet air to the core while utilizing airflow traditionally consumed by banana slots. The plunged inlet holes 140 may provide manufacturing efficiencies by reducing at least one a casting operation in the forming of the banana slots and reducing at least one brazing or welding operation in attaching the banana slots.

Figure 3:
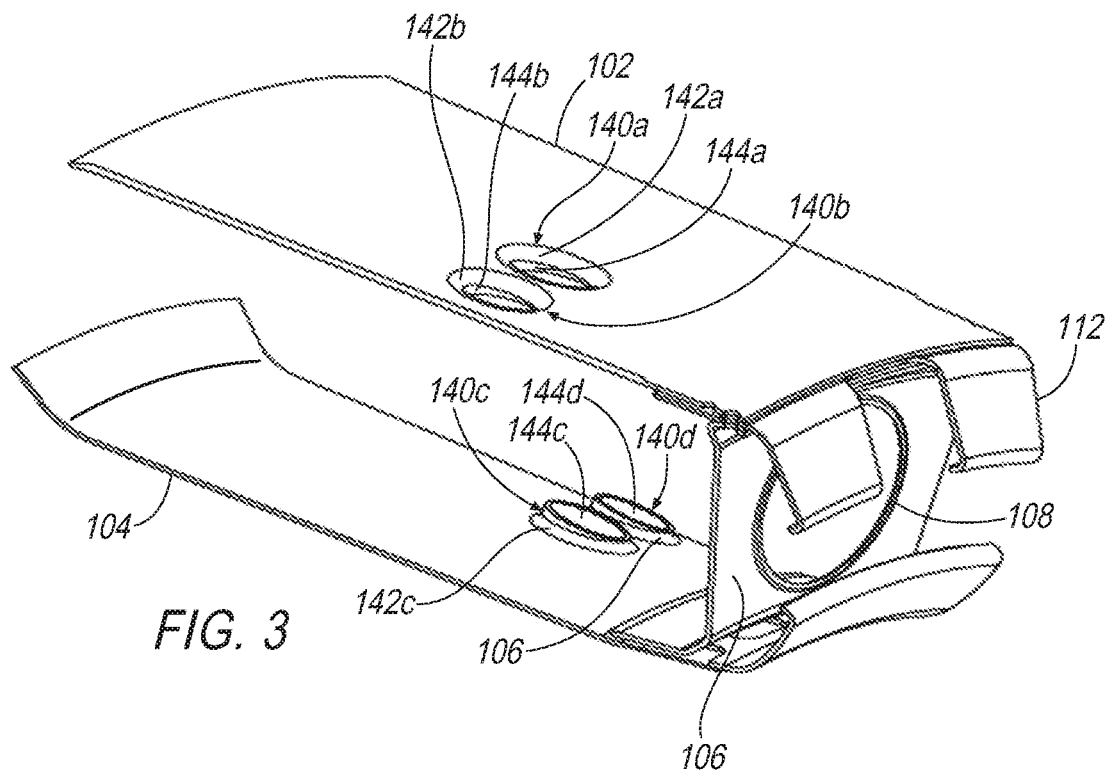
FIG. 3 illustrates an exemplary combustor liner with plunged air inlet holes, for example, each having a transition surface and a radial surface.

Referring to FIG. 3, the combustor 18 may be configured as a counter-swirl combustor. An inner liner 104 and an outer liner 102 extending circumferentially around an engine centerline axis 28 may be configured to from the combustion chamber therebetween, for example an annual combustion chamber. A dome 106 may extend between the inner liner 104 and outer liner 102 and having a plurality of fuel nozzle ports 108 configured to receive a plurality of fuel injectors or nozzles 110, as shown in FIG. 2. Each fuel nozzle port 108 may include a port centerline axis extending axially therethrough. The plurality of fuel injectors or nozzles may each be configured to swirl the fuel and air mixture injected therefrom into the combustion chamber. The inner liner 104 may include at least two primary air inlets 140 (e.g., an inner doublet) circumferentially arranged in a plane or row downstream of and to a lateral side of each port centerline axis. Similarly, the outer liner 102 may include at least two primary air inlets 140 (e.g., an outer doublet) circumferentially arranged in a plane or row downstream of and to an opposite lateral side of each port centerline axis. The outer pair of inlet holes 140 and the inner pair of inlet holes 140 may be offset to opposing lateral sides of each port centerline axis such that the air jets formed create an opposite swirl direction to that of the fuel swirl direction. Thus, combustor 18 may provide counter-swirl mixing.

Figure 4:
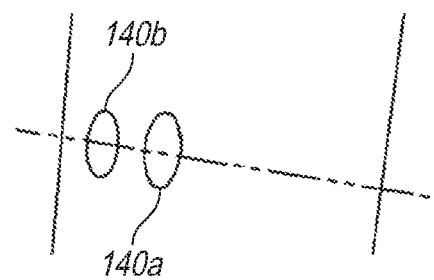
FIG. 4 illustrates exemplary air inlet holes, for example, having an elliptical shape.

The combustor 18 may include outer liner 102 and inner liner 104 having plunged inlet holes 140. The plunged inlet holes 140 may be configured to provide enhanced air penetration into the combustion chamber and enhanced mixing of the air jets with the fuel and air mixture to provide an improved exhaust temperature profile. The plunged inlet holes 140 may be formed as part of each of the outer liner 102 and inner liner 104 thereby forming a continuous surface with each of the outer liner 102 and inner liner 104. The plunged inlet holes 140 may replace a traditional chute that is manufactured independently from and positioned with respect to each of the outer liner 102 and inner liner 104. The plunged inlet holes 140 may be configured to functionally replace the traditional chute, for example a traditional deeply penetrating chute. The plunged inlet holes 140, without utilizing the traditional chute, may form a passage to direct air through the inlet into the combustion chamber. The inlet holes may have any cross sectional shape, for example circular, oval, or elliptical geometries or any combination thereof. As shown in FIG. 4, the inlet holes 140 may be elliptically-shaped, closely spaced doublet.

The plunged inlet holes 140 may replace traditional chutes that are independently casted, positioned relative to, and then welded to each of the inner liner 104 and outer liner 102. Traditional chutes must be actively cooled using multiple crescent-shaped slots ("banana slots") that surround a rearward portion of the chute to maintain an acceptable temperature on the chute, which consumes about a quarter of the air dedicated to the chute and approximately a tenth of the total combustor airflow. The plunged inlet holes 140 may provide sufficient airflow into the combustion chamber without deeply penetrating into the combustion chamber. Further, the plunged inlet holes 140 may not require banana slots, as airflow may conform to the surface of each plunged inlet hole 140 thereby cooling the plunged inlet hole 140. To provide additional cooling, the plunged inlet holes 140 may include one or more effusion holes. Thus, the plunged inlet holes 140, without requiring banana slots, may provide self-cooling while passing an entire airflow into the combustion chamber thereby providing more effective mixing, improved uniformity, and reduced emissions.

Figure 5:
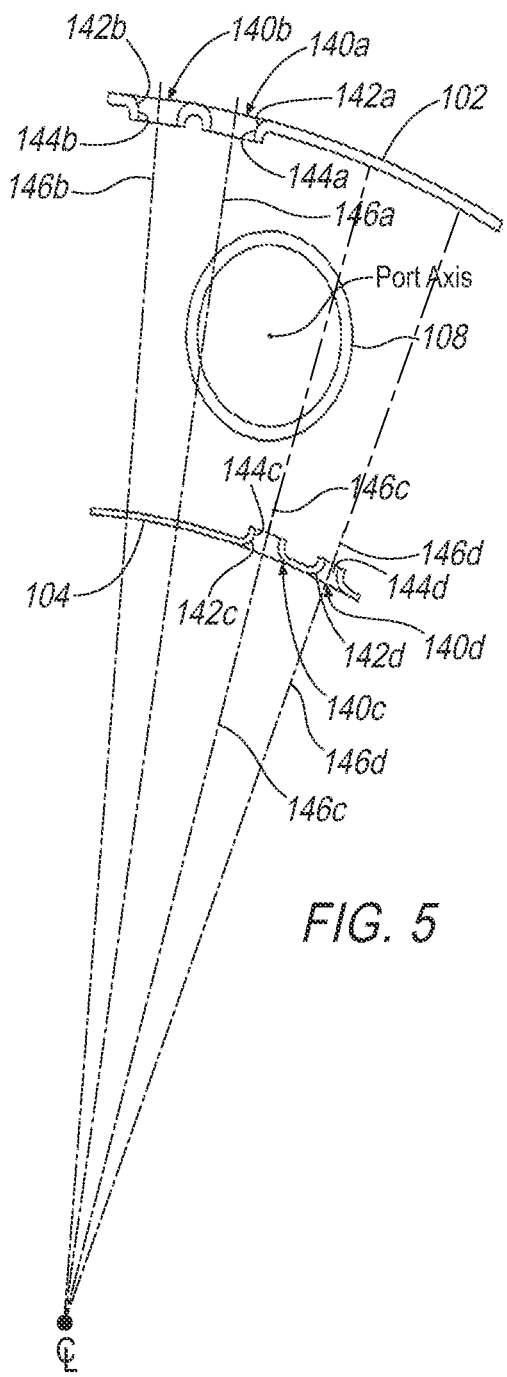
FIG. 5 illustrates exemplary air inlet holes, for example, each having a transition surface and a radial surface.

As shown in FIGS. 3 and 5, the plunged inlet holes 140 may include a transition surface 142 and a radial surface 144. The radial surface 144 may include a substantially flat or converging surface configured to direct airflow into the combustion chamber. The radial surface 144 may be about a radial axis 146 directed toward or through the engine centerline axis 28. The transition surface 142 may include a bell mouth having a rounded surface with an inlet radius, for example, to provide a well-rounded inlet. An exemplary inlet radius of the bell mouth may be at least approximately 20-25 percent of a hydraulic diameter of an opening of radial surface 144. The hydraulic diameter of the opening of radial surface 144 may be determined by multiplying an area of the opening by a factor of four and then dividing by a perimeter of the opening (e.g., Diameter=(Area×4)/Perimeter). For example, if inlet holes 140 having an elliptical shape with a major diameter to minor diameter aspect ratio of approximately 2 (e.g., in a range of approximately 1.8-2.5), the bell mouth may be approximately 120-125 percent of a minor diameter of the radial surface 144.

Figure 6:
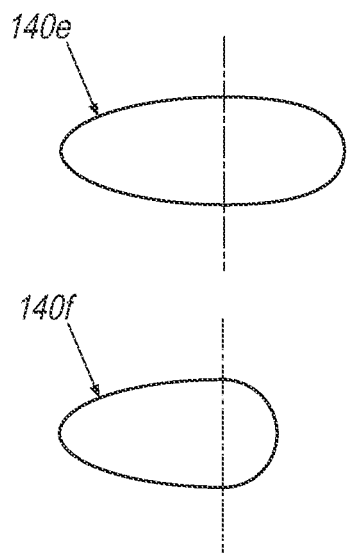
FIG. 6 illustrates exemplary alternative air inlet holes, for example, of various shapes.

As shown in FIG. 6, the shape of the plunged inlet holes 140 may include various shapes. For example, plunged inlet hole 140e includes a first portion having an elliptical shape and a second portion having a race-track shape. Further, plunged inlet hole 140f includes a first portion having an elliptical shape and a second portion having a semi-circular shape. In addition, the plunged inlet holes 140 may include any other shape or combination of shapes configured to provide the features described herein.

The transition surface 142 may provide relatively low entrance losses while preserving a dynamic head for penetration of airflow into the combustor chamber. The transition surface 142 have a depth configured to provide direction to the airflow while starting a jet of airflow beyond a boundary layer. Thus, the plunged inlet holes 140 may be configured to optimize airflow into the combustor chamber.

The plunged inlet holes 140 may be formed using a manufacturing process such a plunging process. The plunging process may include a multi-stage process having at least a first stage and a second stage. The first stage may include penetrating a plunging tool (e.g., having a pair of protrusions having a parallel configuration) through each of the inner and outer liners thereby creating a plunged inlet hole in the inner and outer liners. The second stage may include positioning a forming tool (e.g., having a pair of protrusions having an angular configuration) through each of the openings of the inner liner 104 and outer liner 102 thereby, enlarging the plunged inlet holes 140, angularly orienting the plunged inlet holes along a radial direction relative to the engine centerline axis 28, and creating radial ends on the edges of the plunged inlet holes. The plunging tool and forming tool may be used in conjunction with a female support surface on the combustion chamber side of each of the inner liner 104 and outer liner 102 to support of the first and second stages. In addition, either of the first and second stages may be performed in conjunction with a heat treatment process.

The combustor 18, using the plunged inlet holes, may include a rich front-end (RFE) combustor configured to produce air-fuel compositions to minimize pollutants, such as nitrogen oxides (NOx), during combustion. The combustor 18 may be configured to produce fuel-air compositions to avoid the stoichiometric ratio, which is the air to fuel ratio indicative of the exact amount fuel and air to completely combust the air and fuel without excess remaining reactants. NOx production may increase when the composition approaches stoichiometric. As shown in FIG. 2, the RFE combustor may be configured to generate a fuel-rich composition (e.g., greater than the stoichiometric ratio) at the forward end 130 and a fuel-lean composition (e.g., less than the stoichiometric ratio) at the rearward end 132. Accordingly, the combustor 18 may be configured to minimize NOx production.

The combustor 18 may be configured to provide optimized temperature characteristics including a radial temperature profile and a pattern factor. The radial profile may include a circumferential average of rotating components of the engine. The pattern factor may include a peak temperature of rotationally stationary components of the engine. A reduced radial profile may benefit fan rotor 32, for example, by providing increased thrust and reduced wear and requiring less cooling air. A reduced pattern factor may benefit turbines 20, 22, for example, by providing reduced fuel consumption and wear and requiring less cooling air. The reduced radial profile and pattern factor may increase the durability of the inner liner 104 and outer liner 102 with less cooling required. As a result of the reduced mixing time, the reduced radial profile and pattern factor may minimize NOx production. Thus, the combustor 18 may optimize the temperature characteristics of the engine 10.

The combustor 18 may also be configured to quickly transition from the fuel-rich composition to the fuel-lean composition. This may mix the air and fuel thoroughly and reduce hot regions having a stoichiometric composition in the exhaust. Further, the combustor 18 may be configured to mix the hot regions a minimal distance from the inlet holes. Accordingly, the air inlets may be configured to optimize fuel and air mixing. The combustor 18 may be configured to utilize any combustor length between the front end and back end. For example, combustor 18 may be configured to produce increased combustor uniformity with a longer combustor length or a shorter combustor length.

Methods of operation for a combustor are contemplated. Methods may include providing airflow along the inner liner 104 and the outer liner 102 extending circumferentially around the engine centerline axis 28 thereby forming a combustion chamber therebetween. Methods may further include supplying fuel through the fuel nozzle 110 positioned in the dome 106 between the inner liner 104 and outer liner 102. Methods may further include passing airflow along first and second outer plunged inlet holes 140 formed in the outer liner 102 and extending in a first radial direction toward the engine centerline axis 28 and into at least a portion of the combustion chamber. Methods may further include passing airflow along first and second inner plunged inlet holes 140 formed in the inner liner 104 and extending in a second radial direction away from the engine centerline axis 28 and into at least a portion of the combustion chamber. In addition, the methods may include combusting at least a portion of the fuel and the airflow in the combustion chamber.

The exemplary embodiments herein may be used in conjunction with any system of any vehicle including any engine system thereof. Merely as examples, embodiments of the present disclosure may include or be used in conjunction with any of the systems and methods disclosed in the crossed-referenced disclosures mentioned above, which have been incorporated herein.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. An apparatus for providing combustion, comprising:
an inner liner and an outer liner extending circumferentially around an engine centerline axis thereby forming a combustion chamber therebetween;
a dome extending between the inner and outer liners and having a plurality of fuel nozzle ports configured to each receive a corresponding one of a plurality of fuel nozzles, each of the plurality of fuel nozzle ports having a port centerline axis extending axially therethrough;
a first outer plunged inlet hole and a second outer plunged inlet hole that form an outer doublet in the outer liner, the first and second outer plunged inlet holes of the outer doublet having respective outer transition surfaces connecting the outer liner to corresponding outer radial surfaces extending in a first radial direction toward the engine centerline axis and into at least a first portion of the combustion chamber; and a first inner plunged inlet hole and a second inner plunged inlet hole that form an inner doublet in the inner liner, the first and second inner plunged inlet holes of the inner doublet having respective inner transition surfaces connecting the inner liner to corresponding inner radial surfaces extending in a second radial direction away from the engine centerline axis and into at least a second portion of the combustion chamber, wherein the outer doublet and the inner doublet are offset to opposing first and second lateral sides of one of the plurality of fuel nozzle ports such that the first and second outer plunged inlet holes of the outer doublet are on the first lateral side, respectively about a first pair of radial axes perpendicular to the engine centerline axis and that pass through a first continuous surface of the inner liner on the first lateral side, and the first and second inner plunged inlet holes of the inner doublet are on the second lateral side, respectively about a second pair of radial axes perpendicular to the engine centerline axis and pass through a second continuous surface of the outer liner on the second lateral side, wherein the outer doublet is one of a plurality of outer doublets and the inner doublet is one of a plurality of inner doublets;

wherein each of the plurality of outer doublets and each of the plurality of inner doublets are respectively arranged to the port center axis of each of the plurality of fuel nozzle ports;

wherein the plurality of outer doublets and the plurality of inner doublets are the only inlet holes of the outer liner and the inner liner, respectively.

2. The apparatus of claim 1, wherein the first and second outer plunged inlet holes of each of the plurality of outer doublets are formed to a penetration depth in the outer liner substantially to a first side of the port centerline axis of each of the plurality of fuel nozzle ports, and the first and second inner plunged inlet holes of each of the plurality of inner doublets are formed to the penetration depth in the inner liner substantially to a second side of the port centerline axis of each of the plurality of fuel nozzle ports.

3. The apparatus of claim 1, wherein at least one of:
the first outer plunged inlet hole and the second outer plunged inlet hole of each of the plurality of outer doublets have a common transition surface that is rounded, and
the first inner plunged inlet hole and the second inner plunged inlet hole of each of the plurality of inner doublets have the common transition surface that is rounded.

4. The apparatus of claim 1, wherein each of the respective inner and outer transition surfaces of each of the plurality of inner doublets and each of the plurality of outer doublets, respectively, include a bell mouth.

5. The apparatus of claim 1, wherein at least one of the corresponding inner and outer radial surfaces of each of the plurality of inner doublets and each of the plurality of outer doublets, respectively, is about an additional radial axis relative to the engine centerline axis.

6. The apparatus of claim 1, wherein each of the plurality of inner doublets and each of the plurality of outer doublets each include an elliptical shape.

7. The apparatus of claim 6, wherein the elliptical shape has an aspect ratio in a range of 1.8 to 2.5.

8. A gas turbine engine system for providing combustion, comprising:

a compressor;
a turbine;
a combustor operatively connecting the compressor and the turbine, the combustor including:
an inner liner and an outer liner extending circumferentially around an engine centerline axis thereby forming a combustion chamber therebetween;
a dome extending between the inner and outer liners and having a plurality of fuel nozzle ports configured to each receive a corresponding one of a plurality of fuel nozzles, each of the plurality of fuel nozzle ports having a port centerline axis extending axially therethrough;
a first outer plunged inlet hole and a second outer plunged inlet hole that form an outer doublet in the outer liner, the first and second outer plunged inlet holes of the outer doublet having respective outer transition surfaces connecting the outer liner to corresponding outer radial surfaces extending in a first radial direction toward the engine centerline axis and into at least a first portion of the combustion chamber; and
a first inner plunged inlet hole and a second inner plunged inlet hole that form an inner doublet in the inner liner, the first and second inner plunged inlet holes of the inner doublet having respective inner transition surfaces connecting to the inner liner to corresponding inner radial surfaces extending in a second radial direction away from the engine centerline axis and into at least a second portion of the combustion chamber,
wherein the outer doublet and the inner doublet are offset to opposing first and second lateral sides of one of the plurality of fuel nozzle ports such that the first and second outer plunged inlet holes of the outer doublet are on the first lateral side, respectively about a first pair of radial axes perpendicular to the engine centerline axis and that pass through a first continuous surface of the inner liner on the first lateral side, and the first and second inner plunged inlet holes of the inner doublet are on the second lateral side, respectively about a second pair of radial axes perpendicular to the engine centerline axis and pass through a second continuous surface of the outer liner on the second lateral side,
wherein the outer doublet is one of a plurality of outer doublets and the inner doublet is one of a plurality of inner doublets;
wherein each of the plurality of outer doublets and each of the plurality of inner doublets are respectively arranged to the port center axis of each of the plurality of fuel nozzle ports;
wherein the plurality of outer doublets and the plurality of inner doublets are the only inlet holes of the outer liner and the inner liner, respectively.

9. The system of claim 8, wherein the first and second outer plunged inlet holes of each of the plurality of outer doublets are formed to a penetration depth in the outer liner substantially to a first side of the port centerline axis of each of the plurality of fuel nozzle ports, and the first and second inner plunged inlet holes of each of the plurality of inner doublets are formed to the penetration depth in the inner liner substantially to a second side of the port centerline axis of each of the plurality of fuel nozzle ports.

10. The system of claim 8, wherein each of the respective inner and outer transition surfaces of each of the plurality of inner doublets and each of the plurality of outer doublets, respectively, are rounded.

11. The system of claim 8, wherein each of the respective inner and outer transition surfaces of each of the plurality of inner doublets and each of the plurality of outer doublets, respectively, include a bell mouth.

12. The system of claim 8, wherein at least one of the corresponding inner and outer radial surfaces of each of the plurality of inner doublets and each of the plurality of outer doublets, respectively, is about an additional radial axis relative to the engine centerline axis.

13. The system of claim 8, wherein each of the plurality of inner doublets and each of the plurality of outer doublets each include an elliptical shape.

14. A method of operation for a combustor, comprising;
providing airflow along an inner liner and an outer liner extending circumferentially around an engine centerline axis thereby forming a combustion chamber therebetween, supplying fuel through a fuel nozzle positioned in a fuel nozzle port of a dome between the inner and outer liners;
passing the airflow along a first outer plunged inlet hole and a second outer plunged inlet hole that form an outer doublet in the outer liner, the first and second outer plunged inlet holes of the outer doublet having respective outer transition surfaces connecting the outer liner to corresponding outer radial surfaces extending in a first radial direction toward the engine centerline axis and into at least a first portion of the combustion chamber;
passing the airflow along a first inner plunged inlet hole and a second inner plunged inlet hole that form an inner doublet in the inner liner, the first and second inner plunged inlet holes of the inner doublet having respective inner transition surfaces connecting to the inner liner to corresponding inner radial surfaces extending in a second radial direction away from the engine centerline axis and into at least a second portion of the combustion chamber; and
combusting at least a portion of the fuel and the airflow in the combustion chamber,
wherein the outer doublet and the inner doublet are offset to opposing first and second lateral sides of the fuel nozzle port such that the first and second outer plunged inlet holes of the outer doublet are on the first lateral side, respectively about a first pair of radial axes perpendicular to the engine centerline axis and that pass through a first continuous surface of the inner liner on the first lateral side, and the first and second inner plunged inlet holes of the inner doublet are on the second lateral side, respectively about a second pair of radial axes perpendicular to the engine centerline axis and pass through a second continuous surface of the outer liner on the second lateral side,
wherein the outer doublet is one of a plurality of outer doublets and the inner doublet is one of a plurality of inner doublets;
wherein each of the plurality of outer doublets and each of the plurality of inner doublets are respectively arranged to the port center axis of each of the plurality of fuel nozzle ports;
wherein the plurality of outer doublets and the plurality of inner doublets are the only inlet holes of the outer liner and the inner liner, respectively.

15. The method of claim 14, wherein the first and second outer plunged inlet holes of each of the plurality of outer doublets are formed to a penetration depth in the outer liner substantially to a first side of a port centerline axis of the fuel nozzle port and the first and second inner plunged inlet holes of each of the plurality of inner doublets are formed to the penetration depth in the inner liner substantially to a second side of the port centerline axis of the fuel nozzle port.

16. The method of claim 14, wherein each of the respective inner and outer transition surfaces of each of the plurality of inner doublets and each of the plurality of outer doublets, respectively, that are rounded.

17. The method of claim 14, wherein each of the respective inner and outer transition surfaces of each of the plurality of inner doublets and each of the plurality of outer doublets, respectively, include a bell mouth.

18. The method of claim 14, wherein at least one of the corresponding inner and outer radial surfaces of each of the plurality of inner doublets and each of the plurality of outer doublets, respectively, is about an additional radial axis relative to the engine centerline axis.

19. The method of claim 14, wherein each of the plurality of outer doublets and each of the plurality of inner doublets each include an elliptical shape.

* * * * *